United States Patent
Weng et al.

(10) Patent No.: US 8,020,011 B2
(45) Date of Patent: Sep. 13, 2011

(54) SHARED INTERFACE DEVICE FOR SELECTIVELY USING POWER SUPPLY OVER ETHERNET (POE) CARD AND WIRELESS NETWORK MODULE

(75) Inventors: Kuo-Fu Weng, Taipei Hsien (TW);
Ming-Hong Koo, Taipei (TW);
Hsiao-Feng Pan, Taipei (TW)

(73) Assignee: Sercomm Corporation, Nankang, Taipei (TW)

( * ) Notice: Subject to any disclaimer, the term of this patent is extended or adjusted under 35 U.S.C. 154(b) by 346 days.

(21) Appl. No.: 12/289,362

(22) Filed: Oct. 27, 2008

(65) Prior Publication Data

US 2010/0106984 A1    Apr. 29, 2010

(51) Int. Cl.
*G06F 1/26* (2006.01)

(52) U.S. Cl. ...................................... 713/300; 713/310

(58) Field of Classification Search .................. 713/300, 713/310, 330, 340; 725/220–223, 259–261
See application file for complete search history.

(56) References Cited

U.S. PATENT DOCUMENTS

| | | | | |
|---|---|---|---|---|
| 6,867,689 B2 * | 3/2005 | Yokoo | | 375/222 |
| 7,501,913 B2 * | 3/2009 | Hanada et al. | | 333/132 |
| 7,831,844 B2 * | 11/2010 | Kestelli | | 713/300 |
| 2003/0169157 A1 * | 9/2003 | Yokoo | | 340/310.01 |
| 2007/0149258 A1 * | 6/2007 | Tokunaga | | 455/574 |
| 2008/0068141 A1 * | 3/2008 | Yokomitsu et al. | | 340/310.11 |
| 2008/0104642 A1 * | 5/2008 | Galipeau et al. | | 725/76 |
| 2008/0267212 A1 * | 10/2008 | Crawley et al. | | 370/463 |

* cited by examiner

*Primary Examiner* — Raymond Phan
(74) *Attorney, Agent, or Firm* — Thomas|Kayden

(57) ABSTRACT

The present invention relates to a shared interface device for Power Over Ethernet (POE) and a wireless network module, comprises a motherboard and an interface device used for inserting a POE card or a wireless interface card. The motherboard includes an Ethernet connection interface, a signal processing unit, a logical conversion unit and an external power supply interface. When signals and power from an external network are transmitted via the Ethernet connection interface to the interface device, these signals and power will be further transmitted into the POE card for filtering to capture the power. Then, the captured power will be fed back to the interface device and transmitted via the logical conversion unit to the motherboard for use; when the logical conversion unit receives the power from the external power supply interface, the power is provided for the wireless interface card and the motherboard for use. Such shared design will effectively reduce complexity of circuit layout in the motherboard and lower costs for enterprises in developing a set of independent modules separately.

8 Claims, 6 Drawing Sheets

SHARED INTERFACE DEVICE FOR SELECTIVELY USING POWER SUPPLY OVER ETHERNET (POE) CARD AND WIRELESS NETWORK MODULE

BACKGROUND OF THE INVENTION

1. Field of the Invention

The present invention relates to a shared interface device for Power Over Ethernet (POE) and a wireless network module, particularly to an interface device that is compatible with a POE card and a wireless interface card. Such shared module interface can reduce complexity of circuit layout in the motherboard and lower costs for enterprises in developing a set of independent modules separately.

2. Description of the Related Art

Rapid progress in computer technology results in prevalence of computer devices everywhere in our society, and quick development of network technology presents a new field in people's life, study, work and entertainment, too. Under such circumstances, contacts and communications among people can be enabled through mutual delivery of network messages. Traditionally, connector equipment in Internet is as a communication bridge between the computer devices and the external networks, including RJ45 connectors, etc. However, in recent years, research and development professionals made great efforts to develop wireless network technologies in response to the need of people for strong computational capabilities, fast speed, small size and mobility. These technical developments provide another option in connecting the computer devices with the external networks, and the wireless network interfaces have also been developed in the modular form, making easy to select the wired networks and the wireless networks for use. As wireless network interface devices are designed with standard power and data pins, such design usually allows empty pins to be reserved in the interface devices for the users to carry out additional designs in for special functions. Thus, these interface devices will be extended to utilize special functions excluded in the standard wireless networks.

On the other hand, the conventional wired Ethernet equipments usually use the external independent power sources to supply power for the computer devices or the peripheral devices, such as network equipments and video cameras, etc. However, when use, the aforesaid computer devices are limited by the position of the power sources. As a result, these devices cannot use in the places where the power supply is not available, creating a crucial bottleneck in use. The current solution to this issue lies in the application of 802.3af standards—Power Over Ethernet (POE) constructed by IEEE to add power supply components into the conventional Ethernet equipments for supplying power in the places where the power supply is not available. In addition, the POE is usually installed in the hub and the independent device with Ethernet. If the independent device include the wireless and wired functions at the same time, as shown in FIG. 6, the architecture comprises a motherboard A, an interface device B and a wireless interface card C. The motherboard A comprises an RJ45 connector interface A1, a POE unit A2, a network signal processing chip A3, a microprocessor A4, an I/O connection port A5, a logical conversion unit A6 and an external power supply interface A7. The wireless interface card C is an independent module, which may be selected or may not be selected for use. If the wireless interface card C is not selected, an external network will be connected via the RJ45 connection interface A1 for transmitting the data containing signals and power to the POE unit A2 and the network signal processing chip A3. At this time, the POE unit A2 will filter the signals transmitted from the RJ45 connection interface A1 to capture the power, and then transmit the power to the motherboard A for use through the logical conversion unit A6. In the meantime, the power will also be supplied to the network signal processing chip A3 to process the signals transmitted from the RJ45 connection interface A1. Then, the processed signals will be transmitted from the network signal processing chip A3 via the microprocessor A4 to the I/O connection port A5. When the wireless interface card C is selected to receive signals from the external network, the power from an external source will be supplied through the external power supply interface A7. In such case, the POE unit A2 still cannot be separated from the motherboard A.

However, the prior art still has problems and disadvantages as follows:

1. If the POE is fixed on the motherboard for supplying power to the motherboard, it will occupy some space on the motherboard and result in more difficulties in circuit design and layout of electronic components on the motherboard.

2. If the POE is fixed in the external independent device for supplying power to the motherboard, the enterprises will be required to develop another independent module, which will increase the costs.

Therefore, it is desirable to provide a shared interface device for Power Over Ethernet (POE) and wireless network module that eliminates the aforesaid problems.

SUMMARY OF THE INVENTION

The present invention has been accomplished under the circumstances in view.

The purpose of the present invention lies in use of an Ethernet connection interface to transmit signals and power from an external network to a Power Over Ethernet (POE) card through an interface device. After receiving the signals and power, the POE card filters to capture the power and transmits the captured power back to the interface device, and a logical conversion unit is used to confirm that the power supply comes from the Ethernet, so as to transmit the power to a motherboard for proper processing. While the logical conversion unit receives the power from an external power supply interface, the power will be transmitted to a wireless interface card via the interface device for supplying to the wireless interface card and the motherboard. Since the interface device as mentioned above can be connected with the POE card or the wireless interface card, such shared design can reduce costs for enterprises in developing a set of independent modules separately.

DETAILED DESCRIPTION OF THE PREFERRED EMBODIMENT

Figure 1:
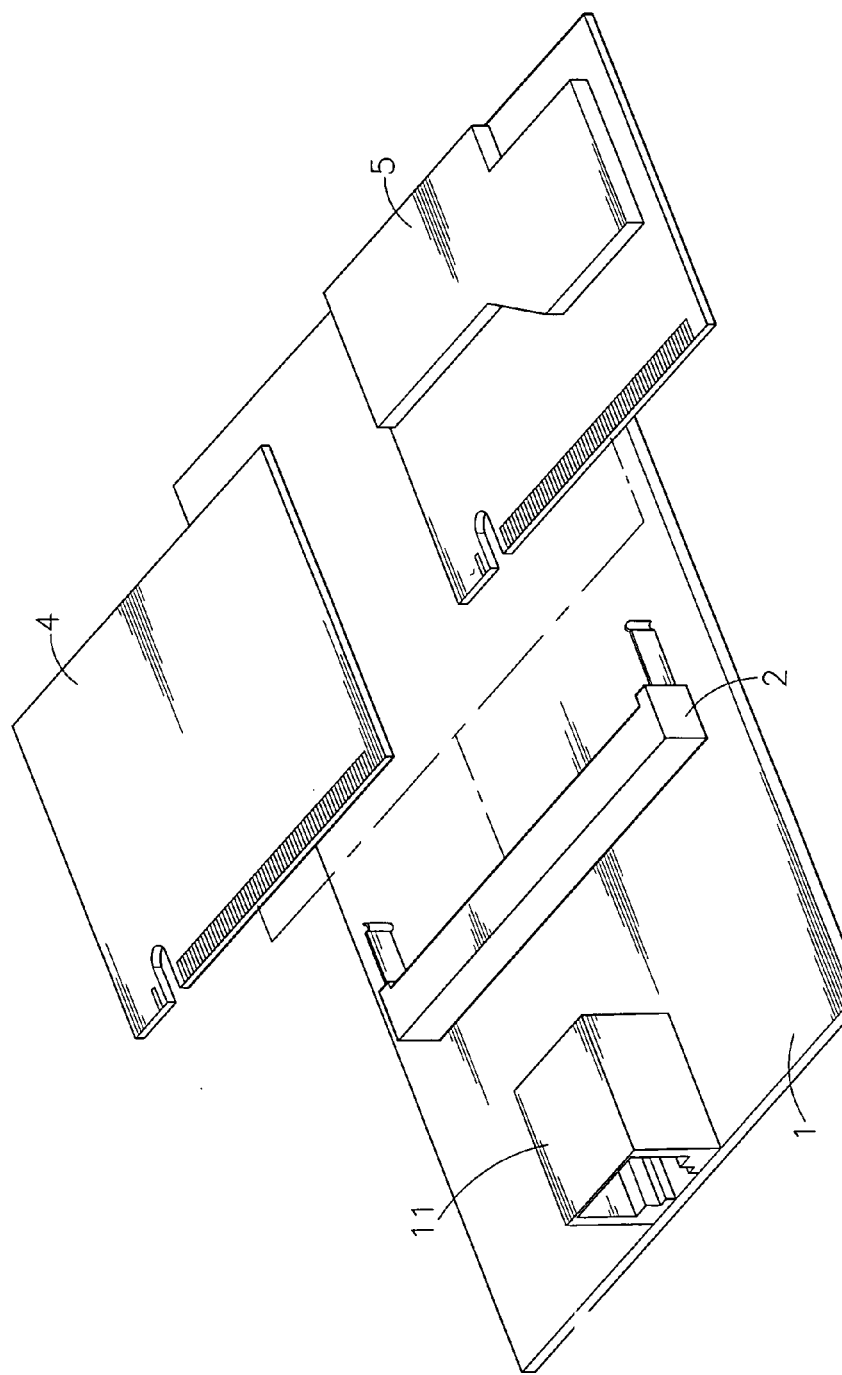
FIG. 1 is an elevational view of the present invention.
Figure 2:
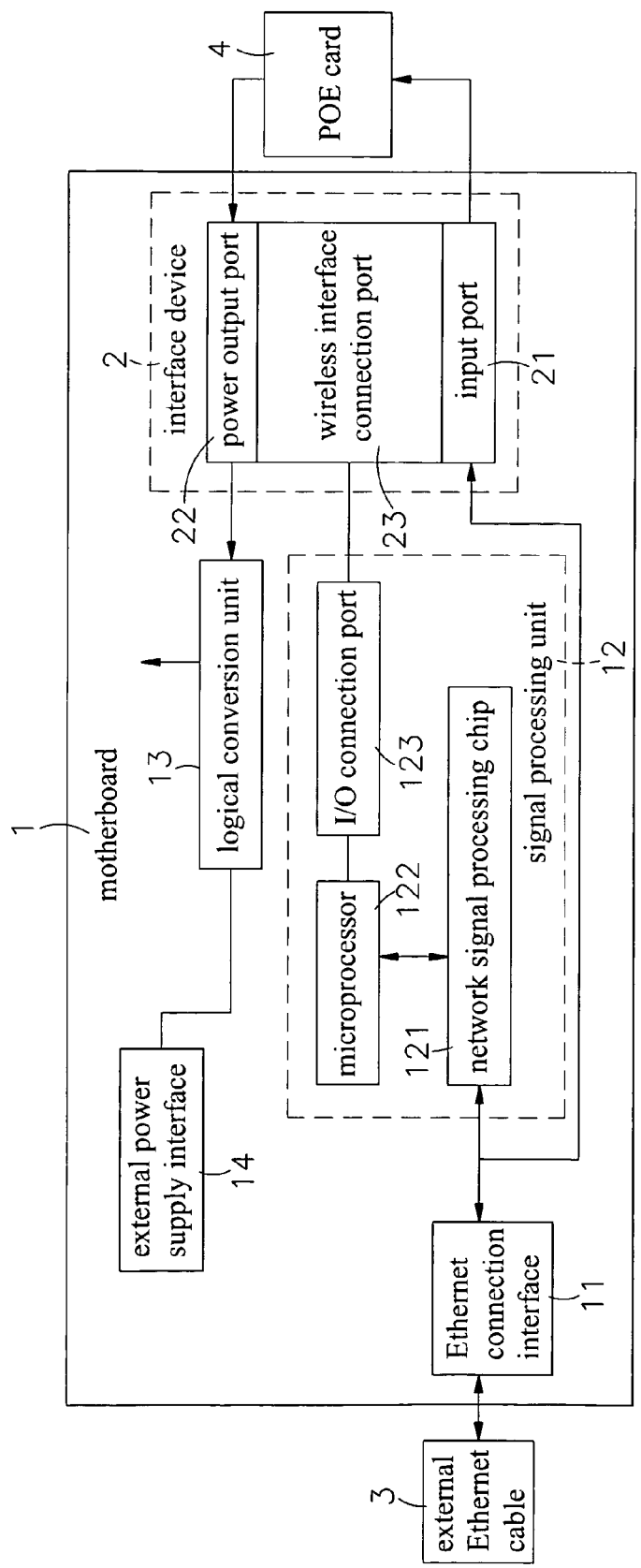
FIG. 2 is a block diagram according to one preferred embodiment of the present invention, showing connecting with a POE card.
Figure 3:
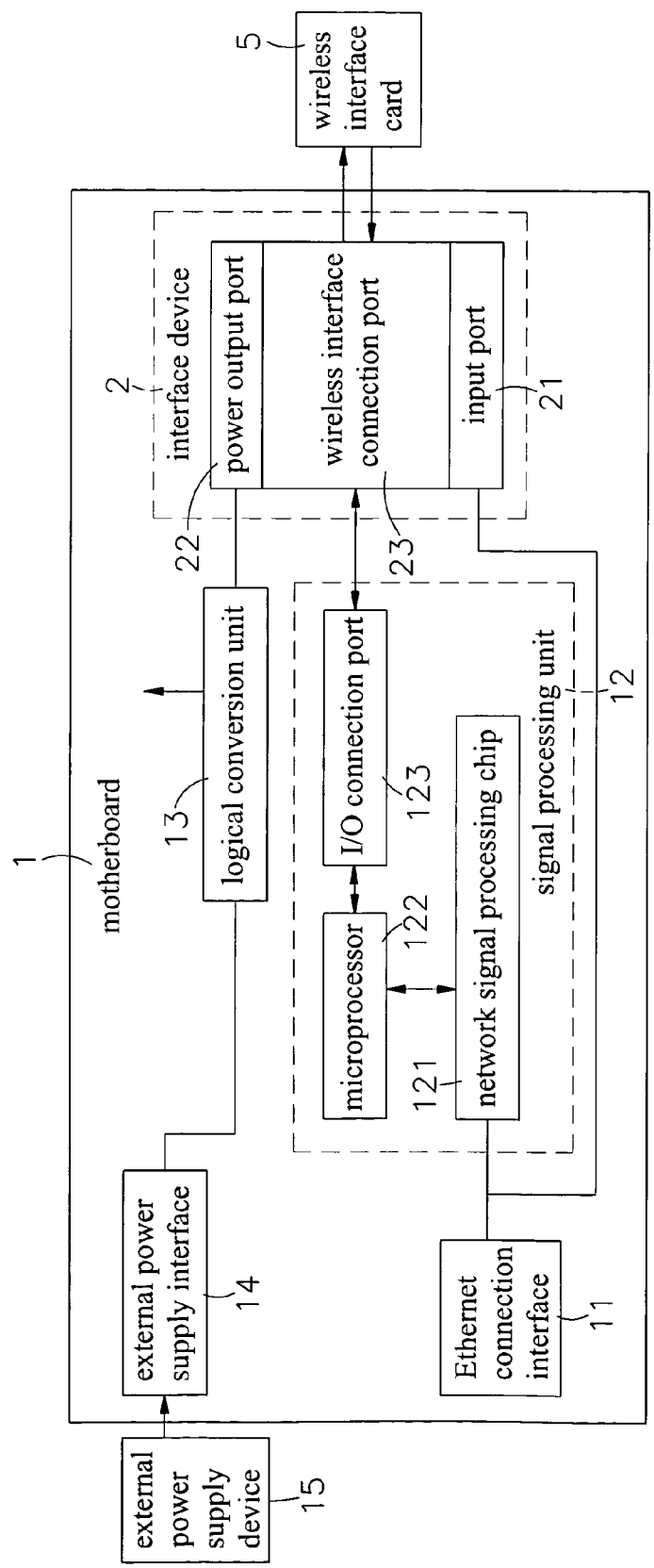
FIG. 3 is a block diagram according to one preferred embodiment of the present invention, showing connecting with a wireless interface card.

Referring to FIGS. 1~3, the present invention comprises a motherboard 1 installed on and connected with an interface device 2, an Ethernet connection interface 11, a signal processing unit 12, a logical conversion unit 13 and an external power supply interface 14.

The motherboard 1 comprises the Ethernet connection interface 11, the signal processing unit 12, the logical conversion unit 13 and the external power supply interface 14. The Ethernet connection interface 11 can receive data from an external network. The signal processing unit 12 consists of a network signal processing chip 121, a microprocessor 122 and an I/O connection port 123. Moreover, the logical conversion unit 13 is connected with the external power supply interface 14, which is linked with an external power supply device 15. In addition, the Ethernet connection interface 11 may be an RJ45 interface or any other Ethernet interface capable of carrying power and signals.

The interface device 2 comprises a power input port 21, a power output port 22 and a wireless interface connection port 23 installed between the power input port 21 and the power output port 22. The power input port 21 can receive the power and signals transmitted from the Ethernet connection interface 11 and transmit to a power over Ethernet (POE) card 4, and the power output port 22 can receive the power separated out from the POE card 4 and transmit to the logical conversion unit 13. In addition, the wireless interface connection port 23 can receive the external power from the logical conversion unit 13 and supply to a wireless interface card 5 for use. The wireless interface connection port 23 can also receive signals from the wireless interface card 5 and transmit the signals to the motherboard 1 for use. The interface device 2 is a mini PCI interface that is a single connector and utilizes empty pins reserved in an original wireless network standard interface to make a connector port where the POE card 4 will be inserted. The wireless interface connection port 23 is standard pins existing in the wireless network standard interface, including the pins for the wireless interface card 5 to transmit power and signals, and the remaining empty pins are designed to be received with the POE card 4, i.e. the power input port 21 and the power output port 22.

Referring to FIG. 2 again, when an external Ethernet cable 3 is used, the POE card 4 is installed in the interface device 2, and the Ethernet connection interface 11 is connected with the external Ethernet cable 3 as a communication media for power supply and wired network signals. When the network signals carrying power are transmitted from the external Ethernet cable 3 to the POE card 4 through the power input port 21 of the interface device 2, the POE card 4 will filter the signals to capture the power, reduce the voltage of the captured power and output the power via the power output port 22 of the interface device 2 to the logical conversion unit 13. After receiving the power from the power output port 22, the logical conversion unit 13 will judge that the power comes from Ethernet and then transmit the power to the motherboard 1 for use. At the same time, the network signal processing chip 121 and the microprocessor 122 starts to process the network signals, and the processed network signals are received and transmitted through the external Ethernet cable 3.

On the other hand, as shown in FIG. 3, when the wireless method is adopted to transmit the wireless network signals, the external power supply device 15 is connected with the external power supply interface 14 to supply the power, and the interface device 2 of the motherboard 1 is connected with the wireless interface card 5, so that the power from the external power supply device 15 is transmitted through the external power supply interface 14 and the logical conversion unit 13 to the motherboard 1 for use. Meanwhile, the power will be transmitted via the wireless interface connection port 23 of the interface device 2 to the wireless interface card 5 for use. Furthermore, the wireless interface card 5 will transmit the wireless network signals to the microprocessor 122 and the network signal processing chip 121 for processing through the wireless interface connection port 23 and the I/O connection port 123, and the processed wireless network signals are received and transmitted via the wireless interface card 5.

Figure 4:
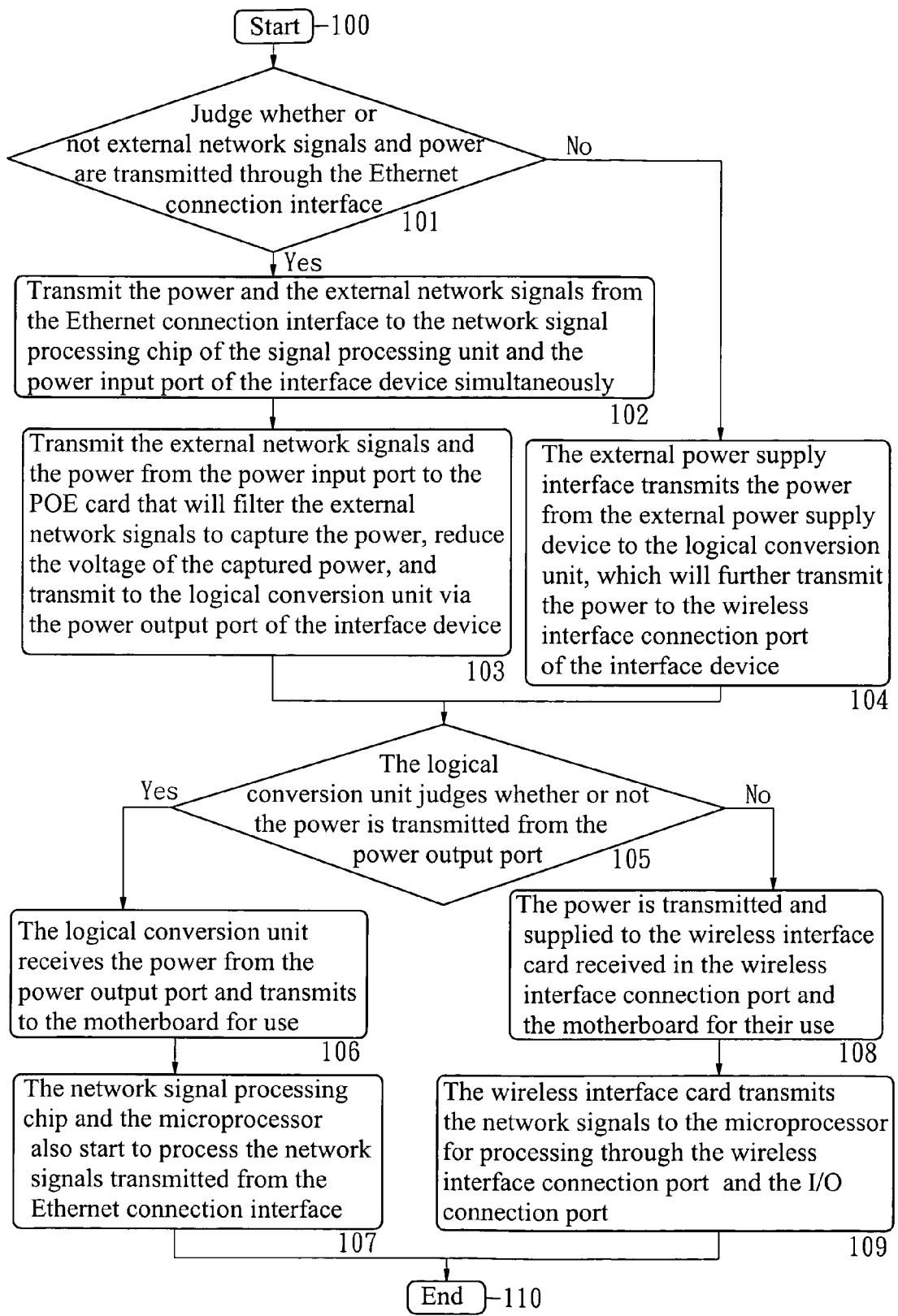
FIG. 4 is an operation flow chart of the present invention.

Referring to FIG. 4, the process of the present invention is described as follows:

(100) Start.

(101) Judge whether or not external network signals and power are transmitted through the Ethernet connection interface 11? And then proceed to step (102) when positive, or step (104) when negative.

(102) Transmit the power and the external network signals from the Ethernet connection interface 11 to the network signal processing chip 121 of the signal processing unit 12 and the power input port 21 of the interface device 2 simultaneously.

(103) Transmit the external network signals and the power from the power input port 21 to the POE card 4 that will filter the external network signals to capture the power, reduce the voltage of the captured power, and transmit to the logical conversion unit 13 via the power output port 22 of the interface device 2. And then proceed to step (105).

(104) The external power supply interface 14 transmits the power from the external power supply device 15 to the logical conversion unit 13, which will further transmit the power to the wireless interface connection port 23 of the interface device 2.

(105) The logical conversion unit 13 judges whether or not the power is transmitted from the power output port 22. And then proceed to step (106) when positive, or step (108) when negative.

(106) The logical conversion unit 13 receives the power from the power output port 22 and transmits to the motherboard 1 for use.

(107) The network signal processing chip 121 and the microprocessor 122 also start to process the network signals transmitted from the Ethernet connection interface 11. And then proceed to step (110).

(108) The power is transmitted and supplied to the wireless interface card 5 received in the wireless interface connection port 23 and the motherboard 1 for their use.

(109) The wireless interface card 5 transmits the network signals to the microprocessor 122 for processing through the wireless interface connection port 23 and the I/O connection port 123.

(110) End.

Figure 5:
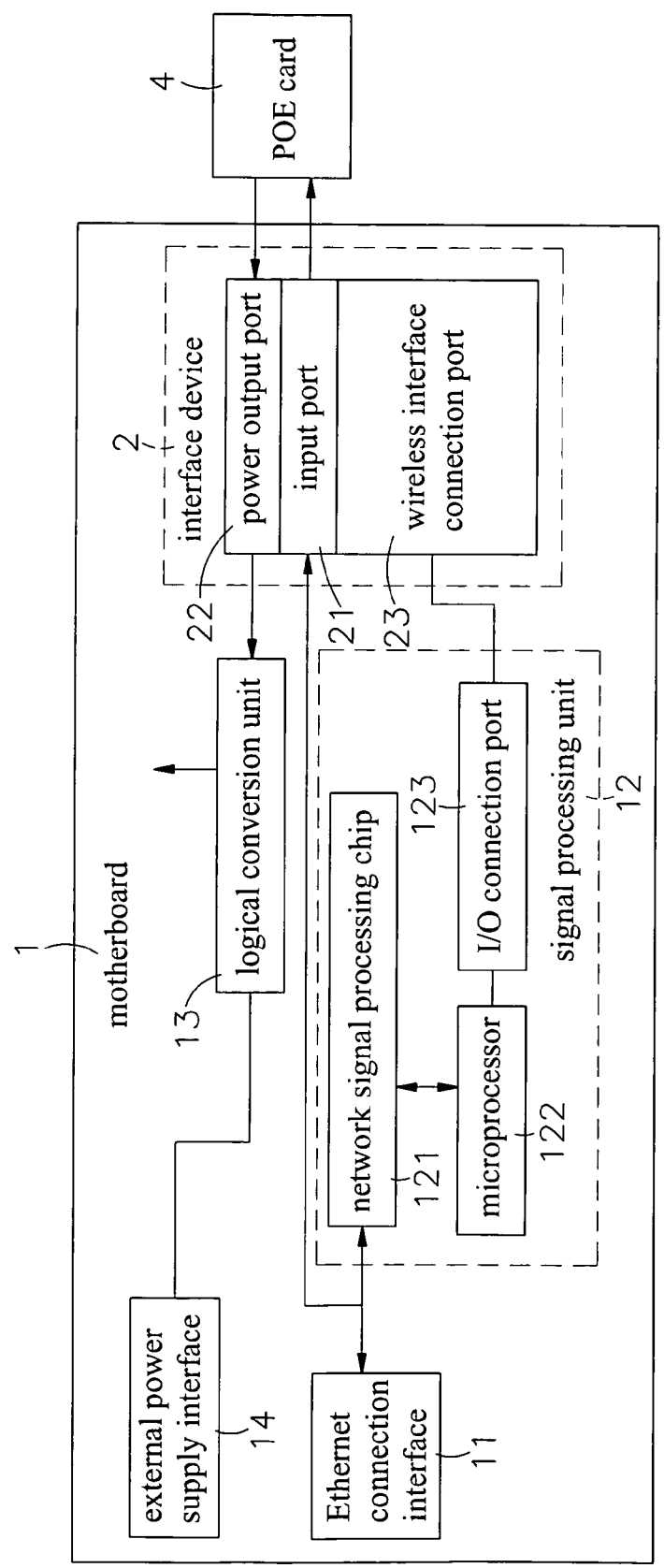
FIG. 5 is a block diagram according to another preferred embodiment of the present invention.
Figure 6:
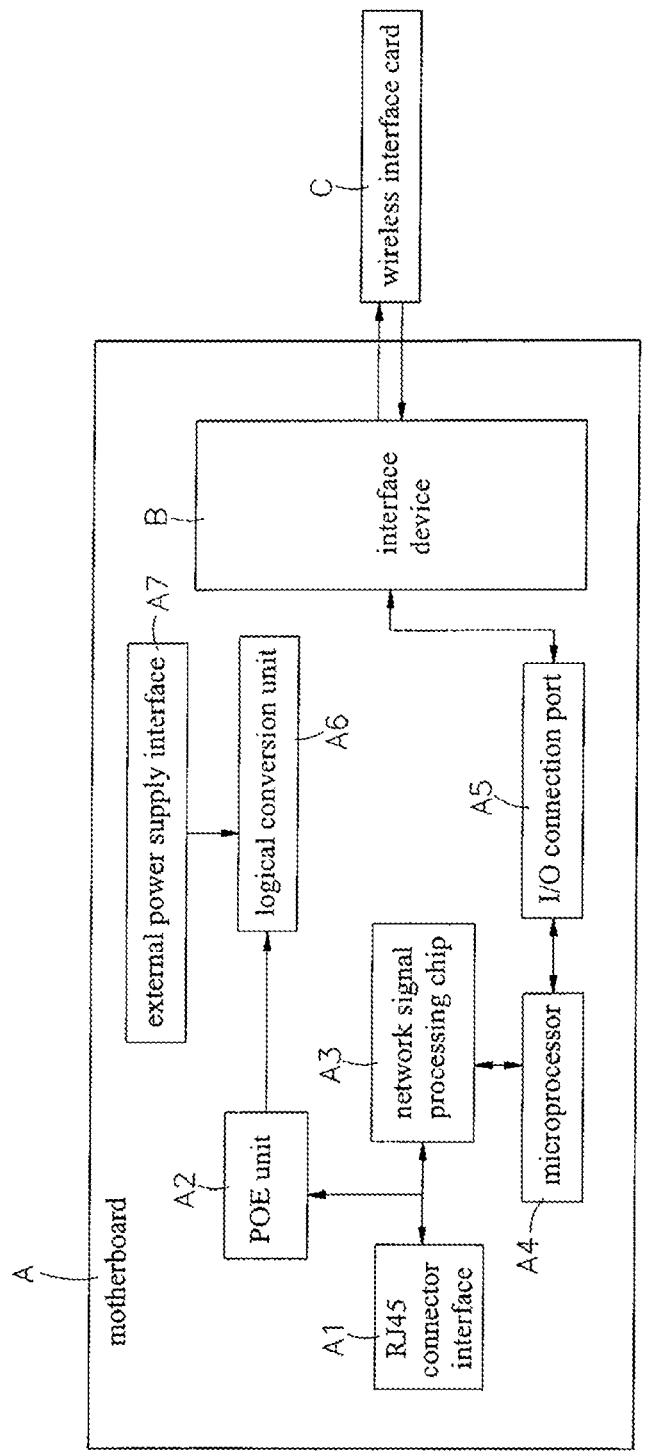
FIG. 6 is a block diagram according to the prior art.

Furthermore, FIG. 5 shows an alternate from of the present invention. According to this embodiment. This embodiment is substantially similar to the embodiment shown in FIG. 2 with exception of the interface device 2. The power input port 21 is installed in the neighborhood of the power output port 22, and the wireless interface connection port 23 is installed in a place close to the power input port 21 or the power output port 22.

In general, the invention has the following benefits and features:

1. The interface device 2 of the present invention is compatible with the wireless interface card 5 and the POE card 4, enabling compatibility with the wireless interface card 5 and the POE card 4 in a single connector structure. Such shared modular design doesn't need to develop a set of independent modules separately for lowering costs.

2. The POE card 4 of the present invention is designed in the modular form for inserting into the interface device 2 on the motherboard 1. In such case, because the POE card 4 is not necessary to fix on the motherboard 1, it will not occupy any space of the motherboard 1. Besides, such design can avoid the signal and electromagnetic interferences between the electronic components on the motherboard 1 and the POE card 4 in the process of power transmission, thus making it much easier for circuit layout of the electronic components on the motherboard 1.

3. The POE card 4 of the present invention is compatible with the interface device 2 and supplies power through the interface device 2 to the motherboard 1 inserted in the motherboard 1 without the need to supply power to a host from a POE module that may be fixed on an external independent device. This will facilitate distribution of space in equipments.

4. The power input port 21 can also be installed in the neighborhood of the power output port 22, and the wireless interface connection port 23 is installed in a place close to the power input port 21 or the power output port 22. Therefore, such structural design will succeed in meeting constant needs of the market for miniaturization of the electronic devices.

The POE card 4, the wireless network interface card 5 and the external power supply device 15 as mentioned above are preset components and devices.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A shared interface device for Power Over Ethernet (POE) and wireless network module comprising:
    a motherboard, said motherboard comprising an Ethernet connection interface, a signal processing unit, a logic conversion unit and an external power supply interface; and
    an interface device mounted on said motherboard for selectively inserting a POE card and a wireless interface card, comprising a power input port, a power output port and a wireless interface connection port;
    wherein said Ethernet connection interface is connected with one end of said signal processing unit and said power input port, said wireless interface connection port is connected with the other end of said signal processing unit, and said logic conversion unit is connected with said power output port and said external power supply interface respectively.

2. The shared interface device for Power Over Ethernet and wireless network module according to claim 1, wherein said signal processing unit comprises a network signal processing chip connected with said Ethernet connection interface, a microprocessor connected with said network signal processing chip, and an I/O connection port connected with said microprocessor and said wireless interface connection port of said interface device.

3. The shared interface device for Power Over Ethernet and wireless network module according to claim 1, wherein said wireless interface connection port of said interface device is installed between said power input port and said power output port.

4. The shared interface device for Power Over Ethernet and wireless network module according to claim 1, wherein said power input port and said power output port of said interface device is installed in the neighborhood of each other, and said wireless interface connection port is installed in the place close to said power input port.

5. The shared interface device for power over Ethernet and wireless network module according to claim 1, wherein said power input port and said power output port of said interface device is installed in the neighborhood of each other, and said wireless interface connection port is installed in the place close to said power output port.

6. The shared interface device for Power Over Ethernet and wireless network module according to claim 1, wherein said interface device is a Mini PCI interface.

7. The shared interface device for Power Over Ethernet and wireless network module according to claim 1, wherein said Ethernet connection interface is an RJ45 interface or any other Ethernet interface capable of carrying power and signals.

8. The shared interface device for Power Over Ethernet and wireless network module according to claim 1, wherein when the POE card is selectively inserted to the interface device, the power input port receives power and signals transmitted from the Ethernet connection interface and transmits the power and the signals to the POE card and the power output port receives power separated out from the POE card and transmits it to the logical conversion unit; when the wireless interface card is selectively inserted to the interface device, the wireless interface connection port receives external power from the logical conversion unit and supply it to the wireless interface card and the wireless interface connection port receives signals from the wireless interface card and transmits the signals to the motherboard.

* * * * *